United States Patent [19]

Wedderburn-Bisshop

[11] Patent Number: 5,070,397
[45] Date of Patent: Dec. 3, 1991

[54] KEYING METHODS FOR DIGITAL VIDEO

[75] Inventor: Thomas Wedderburn-Bisshop, Zetland, Australia

[73] Assignee: Rank Cintel Limited, England

[21] Appl. No.: 682,551

[22] Filed: Apr. 9, 1991

[30] Foreign Application Priority Data

Apr. 11, 1990 [AU] Australia .............................. PJ9585
Jul. 3, 1990 [AU] Australia .............................. PK0988
Mar. 1, 1991 [GB] United Kingdom ................ 9104320

[51] Int. Cl.⁵ .............................................. H04N 9/75
[52] U.S. Cl. ................................................... 358/22
[58] Field of Search ................ 358/22 CK, 22 C, 30, 358/183

[56] References Cited

U.S. PATENT DOCUMENTS

| | | | |
|---|---|---|---|
| 4,051,520 | 9/1977 | Davidse | 358/22 |
| 4,394,680 | 7/1983 | Watanabe | 358/22 CK |
| 4,500,919 | 2/1985 | Schreiber | 358/80 |
| 4,533,937 | 8/1985 | Yamamoto | 358/22 CK |

FOREIGN PATENT DOCUMENTS

| | | | |
|---|---|---|---|
| 204691 | 12/1982 | Japan | 358/22 CK |
| 9491 | 1/1983 | Japan | 358/22 CK |
| 124189 | 7/1985 | Japan | 358/22 |
| 69291 | 4/1986 | Japan . | |

Primary Examiner—Tommy P. Chin
Attorney, Agent, or Firm—Ostrolenk, Faber, Gerb & Soffen

[57] ABSTRACT

A digital video key signal generator for digital video special effects uses two cascaded programmable lookup tables. One table is addressed by the two chroma component signals and the second table is addressed by the luma signal and the output of the first table. The generator is particularly suitable for use with CCIR Rec. 601 digital signals, and can be used for a wide variety of compositing functions, using luma keys, chroma keys, combinations thereof, and multiple chroma keys simultaneously.

2 Claims, 1 Drawing Sheet

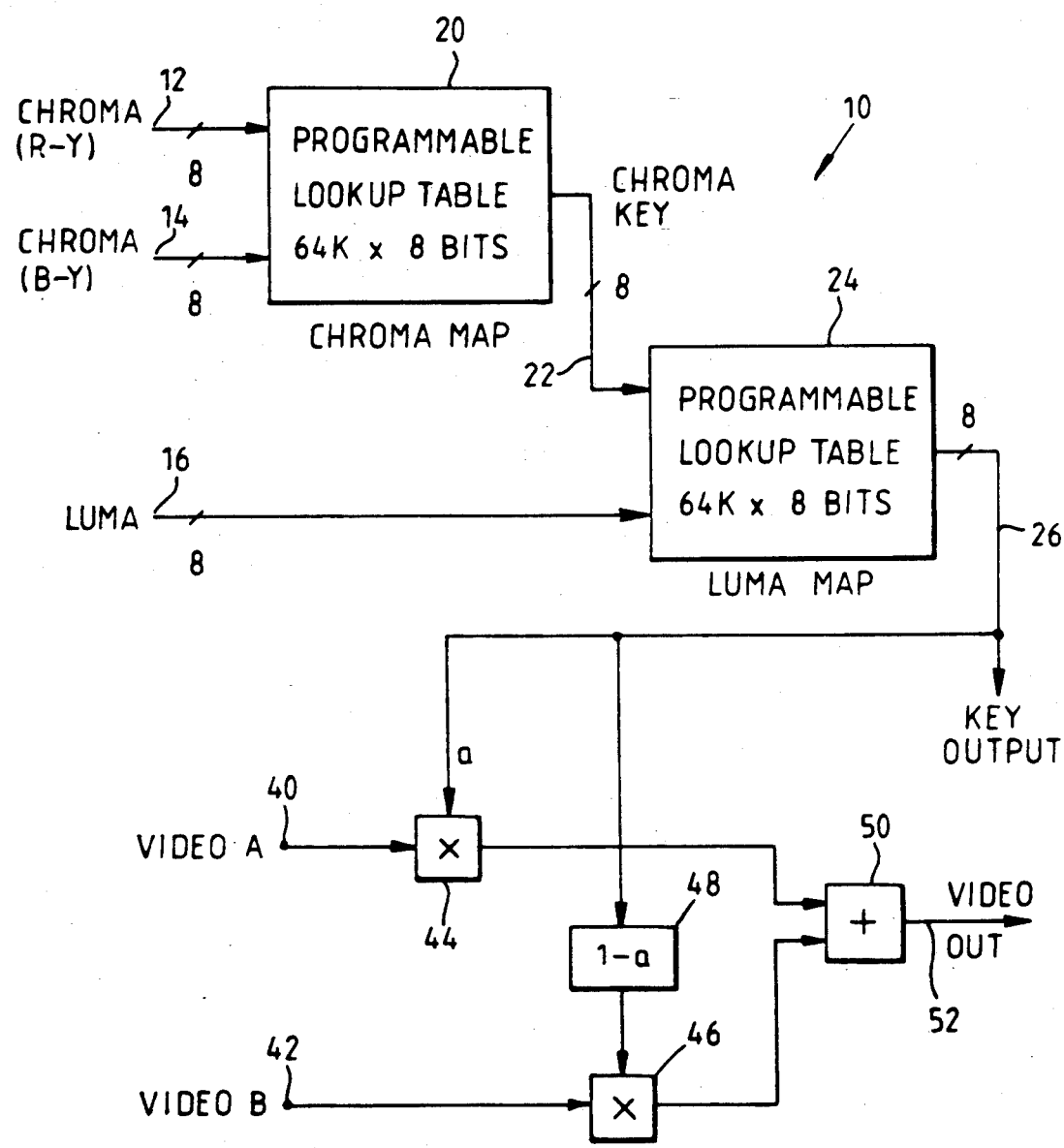

KEYING METHODS FOR DIGITAL VIDEO

BACKGROUND OF THE INVENTION

This invention relates to the generation of keying signals for use with digital video signals. Keying signals or key signals are used to define regions of an image to which a certain operation is to be applied. Typically, a keying signal is used to make a newsreader who is in fact located in a studio appear in front of a picture of a remote location. The background picture may be derived from a slide or solid state store for example. A key signal may also be used to define parts of a picture in which certain colors are to be altered.

The keying signal is usually generated from a video signal itself. For example, the newsreader in a studio, mentioned above, will be seated in front of a blue backdrop. The output of a foreground camera viewing the newsreader is analysed to determine which areas of the picture are blue, and thus to generate a key signal which is used to switch in the background picture in those regions. The key signal may be termed a "matte" or "stencil", and may be single valued (ON or OFF), but is preferably multivalued to allow a fading operation particularly at the boundary of objects for example.

All this has been known in the analogue video processing field for many years.

Key signal generators in the analogue field generally use large amounts of special purpose analogue circuitry such as comparators. In the digital field they use a digital equivalent of this technique.

The present invention is concerned with the adaptation of these techniques for use with digital signals, particularly though not exclusively to digital video signals encoded in accordance with CCIR Recommendations 610 and 656. In accordance with these recommendations, out of every four signal samples, two are luma (luminance) samples, and two are chroma (chrominance) samples. The two chroma samples correspond respectively with the R-Y and B-Y color component signals of the PAL system and are associated in time with one only of the two luma samples.

SUMMARY OF THE INVENTION

We have appreciated that a simple form of key signal generator has particular utility in the generation of key signals for compositing and special effects with digital video signals.

The present invention is defined in the appended claims, to which reference should now be made.

In accordance with this invention it is possible to make a key generator for the real-time generation of digital video keys at video rates, with user-programmable and very flexible key generation rules. It is possible for the key signal to be responsive to both the chroma and luma signals, and can be operated to combine multiple keys, for example. Nevertheless the key generator is small and inexpensive.

BRIEF DESCRIPTION OF THE DRAWING

The invention will now be described in more detail by way of example, with reference to the sole FIGURE of the accompanying drawing, which is a block diagram of a key generator circuit embodying the invention used to control a simple compositing device.

DETAILED DESCRIPTION OF THE PREFERRED EMBODIMENT

The key signal generator 10 shown has two chroma inputs, namely an input 12 for the R-Y component signal and an input 14 for the B-Y signal, and a luma input 16 for the luma signal. All three inputs comprise 8 bit samples in accordance with CCIR Recommendations 601 and 656.

A first programmable read-only memory (PROM) 20 constituting a programmable lookup table is connected to the inputs 12 and 14 to receive the two chroma inputs. The PROM 20 has 64 K or 65536 locations which can be addressed by the two 8-bit inputs, and is 8 bits "deep", i.e. each location contains an 8-bit word which is applied to the PROM output 22 when that location is addressed.

A second PROM 24 also having 64 K locations each of 8 bits is connected to receive 8 bits from the luma input 16 and 8 bits from the output 22 of the PROM 20. The second PROM 22 provides an 8-bit key signal output 26.

Each of the PROMs 20 and 24 may be constituted by a static random access memory (SRAM) such as the Hitachi HM6208HP-35, 64 K×4, 35 ns access time SRAM. Two such devices are neded for each lookup table to give the full eight bits depth. SRAM's are used as they can conveniently be updated from time to time by a microprocessor.

Purely for the purposes of illustration the bottom half of the FIGURE shows a simple compositing system. Two video signals A and B are received at inputs 40 and 42 and applied to respective multipliers 44 and 46. Multiplier 44 receives the keying signal directly from PROM 24, and interprets the 8-bit signal as a fraction a where a varies from 0 to 1 as the key signal varies from 0 to 255. The keying signal is also applied to a complementing circuit 48 which takes the complement of a with respect to one, giveing 1−a. This signal is applied to multiplier 46. The outputs of multipliers 44 and 46 are then added in an adder 50 to produce a video output signal on an output 52.

By cascading two lookup tables in this way it is possible to provide a very large number of very complex keys. In operation, the first table 20 uses the two chroma signals as an address to generate a chroma key, with one 8-bit key value programmed into each location of the table. The table can be considered to be a map of "chroma space", with say R-Y horizontal and B-Y vertical. Thus every possible combination of R-Y and B-Y has its own key value programmed into the chroma map. This key is programmable and can thus be set up in any way the user wants. For example it can be interpreted as a linear key taking the values 0 to 255, or as 8 separate keys to operate 8 quite separate switches in ON/OFF mode, and so on.

The second lookup table 24 combines the chroma key with the luma signal. It is identical in physical construction to the chroma lookup table, but is programmed separately. This then provides a unique key output for each of the 64 K possible combinations of luma and chroma map key in "luma-chroma-key" space. This final output can also be interpreted in any way the user wishes.

Examples of Keying Applications

The key generator illustrated provides arbitrary, user alterable, real-time key generations for digital video signals, such as in accordance with CCIR Recommendations 601 and 656. The arbitrary transformation is accomplished with two banks of 65,536 words of high-speed static RAM to produce an eight-bit key signal. A major advantage of the system illustrated is its flexibility. We have found it to be a particularly convenient tool for enabling the generation of a very wide range of possible types of key signal. Nevertheless it is very simple in construction and is thus not expensive or difficult to make even though it is capable of real-time working. PROMs of appropriate size capable of operating at video rates are readily available.

A number of examples of how the system may be used will now be given.

a. Luma Key

The luma key is the simplest of the applications. This generates a key which is derived only from the luma component of the signal, e.g. the key is ON for all colors darker than a threshold. For this use, the chroma map is filled with a constant value, or alternatively the luma map is filled with 256 copies of the one map, so that the chroma value is ignored.

b. Hard-Edged Single Chroma Key

A hard-edged chroma key can be set up so that a region of chroma space (the chroma key colors) is programmed with 255 (full ON), with all other areas (non-chroma key areas) programmed to 0. This is the same as normal aliased (hard-edged) chroma keying. Note that it is only necessary to distinguish the key area from the non-key area, so one bit of the 8 is sufficient, and the other 7 bits can be ignored.

At the same time, the luma map can be set up, for example, to ignore the darkest and lightest of colors. For example, if the chroma key color is mid blue, then very dark blue and very pale blue should not generate a key output. The output of this map (either 1 bit or more) is a hard-edge chroma key defined both by a chroma space and by a luma range.

c. Hard-Edge Multiple Chroma Key

In an extension of this principle, using all 8 bits of keys, the chroma map can be set up so that there are up to 256 independent chroma regions, with the output of the chroma lookup table being defined as the region in which the chroma of that pixel falls. Each of these regions can be defined independently can arbitrarily, provided that they do not overlap.

This key is then fed to the luma map, which is programmed to output an 8-bit key (which is interpreted any way the user wishes which is programmable for each color region, with a luma profile attached. The simplest application of this is to define a certain number of the 256 color regions as chroma-key regions, and the others as non-key regions, then use the usual luma profiling (remove dark and bright) to generate a one-bit key which is true for all pixels within the defined regions. It is also possible to form 8 independent one-bit keys out of this map, or simply output the region number if it was in the right luma range. Similar extensions will be apparent to those skilled in the art.

d. Soft-Edged Chroma Key

A soft-edged (anti-aliased) chroma key can be set up so that a region of chroma space (the chroma key colors) is programmed with 255 (full ON), a surrounding region is programmed in the range 1 to 254, fading out to 1 as it goes outwards, with all other areas of (non-chroma key areas) programmed to 0. There is no reason to limit this to one region as it is feasible to define blue-green and yellow as both chroma-key regions, for example. As well as this, the profile of the fall-off from key to non-key need not be linear (or even monotonic), but can be whatever the user desired.

At the same time, the luma map can be set up, for example to ignore the darkest and lightest of colors by multiplying the first key by a profile. For example, if the chroma key color is mid blue, then very dark blue and very pale blue should not generate a key output. Of course, the profile of the fall-off from key to non-key need not be linear (or even monotonic), but can be whatever the use desired. The output of this map is a soft-edged chroma key defined both by a chroma space (or spaces) and by a luma profile.

e. Combinations of Keys

One of the major advantages of this technique for generating keys is its immense flexibility. The effects above can be combined: for example with a multiple-region linear key. In this example, the aim is to show a figure of a news reader (who is filmed in front of a chroma-key background) in front of a pre-recorded backdrop, and at the same time make the eyes (a dull grey color) bright blue. One thing that is necessary for this is that the key signal be encoded with the information as to whether each pixel is in the newsreader, the chroma-key background, or the eyes. This can be defined in the following way: one bit determines whether the key applies to the eyes or the background, while the other 7 bits are a linear key identifying the match of the color with the chroma-key color or eyes.

The key signal can therefore be readily produced. The chroma map is programmed to generate a linear key as described for the two regions. This key is then sent to the luma map, where the one-bit key is passed straight through while the 7-bit key is modified by a luma profile (different for the two color regions, of course). This means that the two color regions have been uniquely defined in three-dimensional color space.

I claim:

1. A digital video key signal generator, comprising: first and second chroma inputs for receiving first and second chroma digital signals, a first programmable lookup table device coupled to the first and second chroma inputs to be addressed by the first and second chroma signals and to output a chroma key signal in response thereto, a luma input for receiving a luma digital signal, and a second programmable lookup table device coupled to the luma input and to the output of the first programmable lookup table device to be addressed by the luma signal and the chroma key signal and to output an output key signal in response thereto.

2. A machine method of generating a digital video key signal, comprising the steps of providing a first programmable lookup table device and a second programmable lookup table device, programming said devices with lookup tables, applying first and second chroma digital signals to address said first programmable lookup table device to output a chroma key signal in response thereto, and applying a luma digital signal and said chroma key signal to address said second programmable lookup table device to output an output key signal in response thereto.

* * * * *